April 19, 1927.                                                        1,625,589
R. E. BLETCHER ET AL
SILENCER OR FLOW REGULATOR FOR VALVES, FAUCETS, AND THE LIKE
Filed Jan. 25, 1926

Inventors
Ralph E. Bletcher,
Ernest H. Bucknell.
by: N.W. Crandall
        Atty.

Patented Apr. 19, 1927.

1,625,589

UNITED STATES PATENT OFFICE.

RALPH E. BLETCHER AND ERNEST H. BUCKNELL, OF LOS ANGELES, CALIFORNIA.

SILENCER OR FLOW REGULATOR FOR VALVES, FAUCETS, AND THE LIKE.

Application filed January 25, 1926. Serial No. 83,591.

This invention relates to a combined silencer and flow regulator for valves, faucets and the like, and has for its object to provide a device that will not only regulate the flow of water or other liquid through valves, faucets, pipe lines and kindred structures, but will at the same time eliminate the noise usually made by liquid valves and faucets, closet tanks &c.

The invention consists in certain features of construction and arrangement of parts, as hereinafter described and pointed out in the claims. And while we herewith illustrate and describe a preferred form of the device, we do not wish to be understood as limiting ourselves to the form shown, but desire the liberty to make such alterations and adaptations as may rightfully come within the scope of the appended claims.

Referring to the drawings, like characters of reference denote like parts through all of the views.

Figure 1:
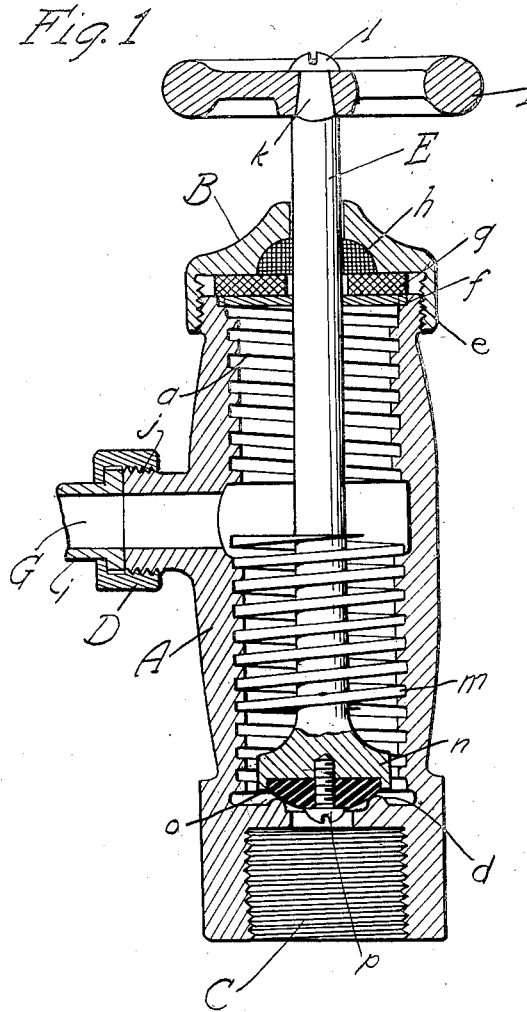
Fig. 1, is a view in longitudinal section of the body member, the silencer and actuating means being shown in elevation, the valve member which is formed integral with the actuating means being shown in longitudinal section.
Figure 2:
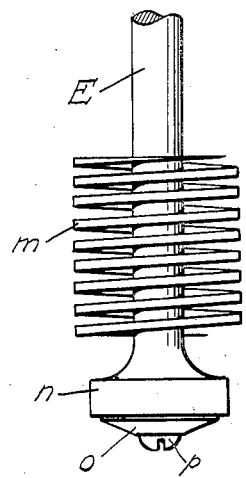
Fig. 2, is a detail of the silencer member together with the actuating member or valve stem and valve head shown in elevation, the valve stem being illustrated with the upper end thereof broken away.
Figure 3:
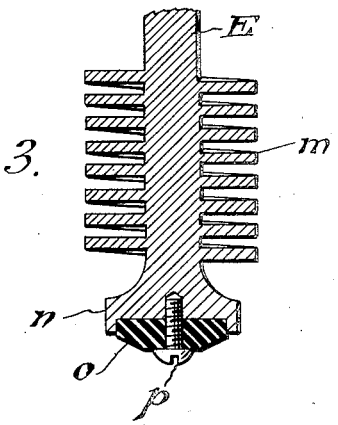
Fig. 3 is a longitudinal central section through the parts shown in elevation in Fig. 2.

Referring to Fig. 1, A, is the body member, B, is a stuffing box cap, C, is an internally threaded section for attaching the device to a liquid supply system (not shown).

D, is a section of a union fitting for connecting the device with an exhaust or drain system (also not shown).

E, is the silencer and control valve actuating member or valve stem, and F, is a hand wheel for actuating the valve member to regulate the flow of liquid through the device.

G, is a section of the outlet pipe connection showing the passage therethrough.

The stem E extends well out through the upper end of the body member, and upon the outer end of the stem is secured the wheel F, for the purpose of actuating the valve head portion thereof, shown at $n$, also the removable flexible valve washer $o$, which is secured thereto by the screw $p$.

The silencer $m$, may be formed integrally with the stem E, or it may be wound in a spiral form and secured in place upon the stem, in any approved manner such as brazing or welding.

The body member A, is provided with an inlet port $d$, and an internal or female thread $a$, into which the silencer member $m$, is screwed as shown in Fig. 1, and when screwed to its extreme lower limit the valve washer $o$ coacts with a seat in the body member to close the port $d$ entirely.

When assembled complete, a metal washer $f$, is seated in the recess as shown in Fig. 1, and a fiber gasket or other suitable equivalent is seated upon the top of the metal washer $f$, and a rubber or other flexible packing gasket $h$, is housed in the recess of the cap B, and the cap screwed down upon the thread $e$, holding the gaskets $f$, $g$, and $h$, all securely together, thereby forming a liquid tight joint seal about the stem E.

The deep thread of the silencer $m$, may be cut of varying depths if found desirable, and of utility in regulating the flow of the liquid through the device when in operation.

It is also obvious that the thread may be of multiple construction, where found advantageous.

It is also obvious that the depth of either the male thread $m$ of the silencer or the female thread of the body A that cooperates therewith may be varied wherever it is found to be expedient.

In operation, it is obvious that when the valve washer $o$, is retracted from contact with the seat surrounding the port $d$, that the liquid (if under pressure) will pass up through the port $d$, and around the valve head $n$, and through the circuitous route through the silencer member $m$, and out through the port G, and as the retraction is increased the upper threaded section of the silencer will be brought into alignment with the port of exhaust and more and more liquid will be allowed to pass as the silencer member is raised higher and the valve head $n$, is retracted farther away from the seat surrounding the port $d$, and as the motion of the threaded male member is reversed, the flow of the liquid will be retarded accordingly.

The silencing of the flow is accomplished by the flow of the liquid being caused to flow around the stem of the member E, in the long circuitous route as described.

Having fully described our invention, we claim:

1. In a device of the character described, an internally threaded body member, an externally threaded member within said body member and in threaded engagement therewith in a manner designed to allow of the flow of liquid through a circuitous path formed by the thread of the externally threaded member, and provided with external means for actuating said externally threaded member for the purpose of retarding or accelerating the flow of liquid through said body member.

2. In a device of the character described, a threaded female member having a passage therethrough, a deep threaded male member threadedly engaging said female member and having its thread of constant depth and designed so as to allow liquid to pass through a circuitous path formed by the thread of the male member, with external means of regulation whereby the liquid is allowed to escape from varying positions or sections of said deep threaded male member.

3. In a device of the character described, a body member provided with an inlet port and an outlet port, a deep threaded member therein threadedly engaging said body member and provided with a valve head on one end, and external means for actuating said member for retarding and accelerating the flow of liquid through said device and for completely closing the said inlet port; said threaded member being adapted for the flow of liquid through a circuitous path formed by its thread.

RALPH E. BLETCHER.
ERNEST H. BUCKNELL.